M. A. BLOSSER.
SANITARY MILK CAN COVER.
APPLICATION FILED NOV. 24, 1919.
1,351,611.
Patented Aug. 31, 1920.
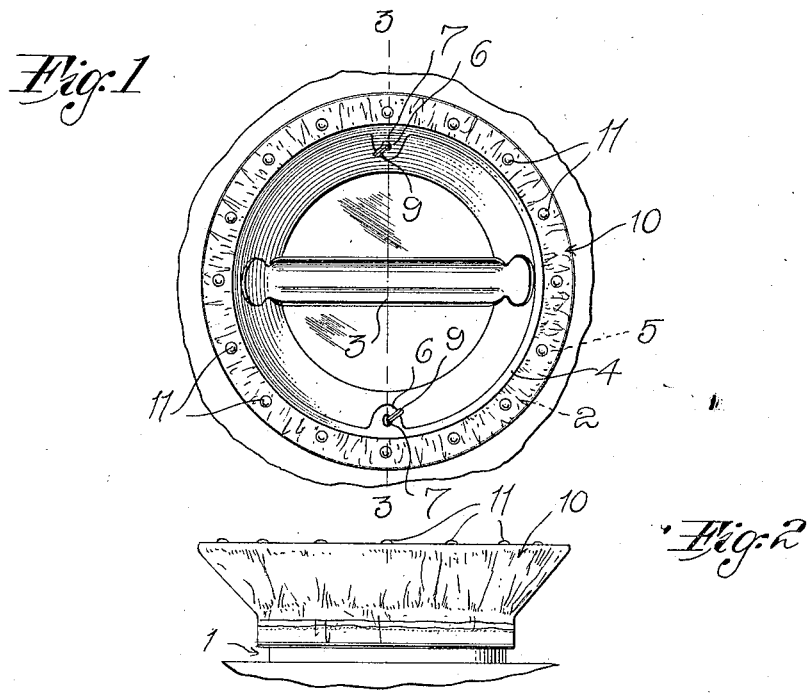
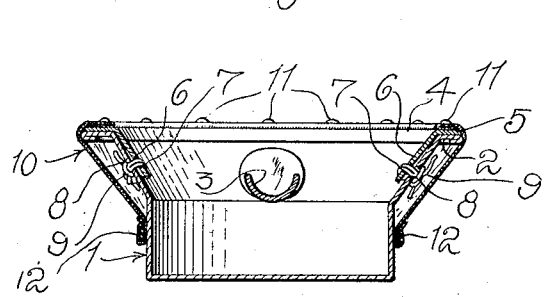
Inventor
Mary A. Blosser.

UNITED STATES PATENT OFFICE.

MARY A. BLOSSER, OF BEVER TOWNSHIP, MAHONING COUNTY, OHIO.

SANITARY MILK-CAN COVER.

1,351,611.     Specification of Letters Patent.     Patented Aug. 31, 1920.

Application filed November 24, 1919. Serial No. 340,142.

*To all whom it may concern:*

Be it known that I, MARY A. BLOSSER, a citizen of the United States, residing at Bever township, in the county of Mahoning and State of Ohio, have invented certain new and useful Improvements in Sanitary Milk-Can Covers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sanitary means for attachment to the lids of milk cans for preventing foreign matter getting into the milk.

The device comprises a simple and efficient means of this nature having various details of construction, combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a top plan view showing the device as applied to the lid.

Fig. 2 is a side elevation, and

Fig. 3 is a cross sectional view on line 3—3 of Fig. 1.

Reference now being had to the details of the drawings by numerals:

1 designates the lid of a milk can of the usual construction having a flaring top portion, with a flange 2, and 3 is a handle fastened at its ends to the inclined or flaring part of the lid. A ring 4, of any suitable metal, preferably aluminum, is adapted to rest upon the flange of the flaring top, and has an inner peripheral flange 5 conforming to and adapted to engage the flaring part of the lid. At points diametrically opposite and integral with the flange 5 are projections or lugs 6 which have apertures 7 therein, and 8 designates apertures formed in the flanged part of the lid. Fastening wires 9 are passed through said apertures in the flaring part of the top and the apertures of said projections or lugs, and when twisted together form a secure means to hold the ring upon the top of the lid.

A sheet of canvas 10, or other suitable material, is preferably folded upon itself and stitched to form a double thickness along its upper marginal edge, and the folded part is held to the ring by means of rivets 11, or other suitable fastening means, and the lower edge of said canvas is provided with a pocket formed by an inward turning of the edge of the canvas or other material, and an elastic band 12 is placed within said pocket and tends to hold the lower edge of the canvas yieldingly against the circumference of the lid below the flanged portion thereof.

When the device as shown and described is adjusted to the lid, it will be noted that a secure means is afforded for preventing foreign matter from getting by the lid into the can containing the milk. When it is desired to remove the ring with its protecting sheet of canvas for the purpose of washing the latter, it may be easily and quickly done by first detaching the wiring and pulling the ring from off the lid, the elastic band permitting the quick removal by stretching to permit the canvas to pull over the flaring top, after which the canvas may be sterilized and re-used, or replaced by new material when desired.

In applying the lid, equipped with my device, to a can, the lid is slipped into the neck of the can and the lower circumferential portion of the canvas, containing the resilient clamping member 12, is turned up to allow the lid to be slipped fully into the can neck, and then the said lower circumferential portion turned down over the exterior surface of the can neck, the resilient clamping member or band 12 securing said lower circumferential portion of the canvas tightly around the can neck, thereby preventing access of dirt to the milk within the can.

What I claim to be new is:

1. A protecting device for milk can covers comprising a ring, means for fastening the same to the cover, and a sheet of flexible material fastened to said ring and adapted to be held against the circumference of the can neck.

2. A protecting device for covers of milk cans comprising a ring, and means for fastening the same to the cover, a sheet of flexible material secured to said ring, and yielding means for holding said fabric to the circumference of the can neck below the ring.

3. A protecting device for covers of milk cans comprising a ring adapted to be fastened to the top of the cover, and provided with a sheet of flexible material fastened to said ring, with elastic means for holding the fabric about the circumference of the can neck.

4. A device for protecting covers of milk cans comprising in combination with a flaring portion of the cover, a ring, means for fastening the same to the cover, a sheet of flexible material fastened to said ring, and elastic means for holding the fabric about the circumference of the can neck.

5. A protecting device for covers of milk cans, comprising in combination with the cover, a ring adapted to rest upon the top of the cover and having a flange about its inner periphery, and integral lugs which are apertured, means for passing through the apertures in said lugs and apertures in the cover to hold the ring in place, a sheet of flexible material fastened to said ring and adapted to fit over the upper edge of the cover, and an elastic band adapted to hold said fabric about the circumference of the can neck.

6. The combination with a milk can and a cover projecting into the can neck and frictionally engaging the same, of a flexible member depending from the top of said cover and encircling the side wall thereof, and an element, at the lower marginal portion of said flexible member, yieldingly holding the latter tightly around the exterior surface of the can neck.

In testimony whereof I hereunto affix my signature.

MARY A. BLOSSER.